US007130162B2

United States Patent
Seyama et al.

(10) Patent No.: US 7,130,162 B2
(45) Date of Patent: Oct. 31, 2006

(54) MAGNETIC SENSOR AND METHOD OF MANUFACTURING THE SAME

(75) Inventors: Yoshihiko Seyama, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 09/788,823

(22) Filed: Feb. 20, 2001

(65) Prior Publication Data

US 2001/0015877 A1 Aug. 23, 2001

(30) Foreign Application Priority Data

Feb. 22, 2000 (JP) ............................. 2000-044828

(51) Int. Cl.
*G11B 5/39* (2006.01)
(52) U.S. Cl. .................................. 360/322; 29/603.15
(58) Field of Classification Search ................ 360/319, 360/322, 324, 324.1, 324.11, 324.12
See application file for complete search history.

(56) References Cited

U.S. PATENT DOCUMENTS

| 5,079,663 | A | * | 1/1992 | Ju et al. ...................... 360/322 |
| 5,446,613 | A | * | 8/1995 | Rottmayer .................. 360/319 |
| 5,576,914 | A |   | 11/1996 | Rottmayer et al. .......... 360/113 |
| 5,731,937 | A | * | 3/1998 | Yuan .......................... 360/322 |
| 6,018,862 | A |   | 2/2000 | Stageberg et al. ........ 29/603.14 |
| 6,134,089 | A | * | 10/2000 | Barr et al. ................... 360/319 |
| 6,198,609 | B1 | * | 3/2001 | Barr et al. ................... 360/322 |
| 6,512,660 | B1 | * | 1/2003 | Li et al. ...................... 360/324 |
| 6,563,679 | B1 | * | 5/2003 | Li et al. ...................... 360/324 |
| 6,738,234 | B1 | * | 5/2004 | Araki et al. ................. 360/319 |

FOREIGN PATENT DOCUMENTS

| EP | 0 675 371 A2 | 10/1995 |
| EP | 0 930 624 A1 | 7/1999 |
| EP | 0 953 849 A2 | 11/1999 |

* cited by examiner

*Primary Examiner*—Andrea Wellington
*Assistant Examiner*—Christopher R. Magee
(74) *Attorney, Agent, or Firm*—Greer, Burns & Crain, Ltd.

(57) ABSTRACT

In a magnetic sensor, a lower terminal layer, a magnetosensitive layer, and a cover film are simultaneously patterned into substantially the same size. The opposing surface of the lower terminal layer, which opposes the magnetosensitive film is substantially superposed on one opposing surface of the magnetosensitive film. The opposing surface of the upper terminal layer, which opposes the magnetosensitive film is formed into a shape smaller than and included in the other opposing surface of the magnetosensitive film. This implements a magnetic sensor which uses a CPP structure and is yet readily processible and which includes a substantially accurate fine CPP structure in accordance with a desired output.

28 Claims, 12 Drawing Sheets

FORMATION OF LOWER
TERMINAL LAYER/
GMR LAYER/COVER LAYER

RESIST FORMATION

ETCHING

RESIST REMOVAL

INSULATING FILM FORMATION

RESIST FORMATION

ETCHING

RESIST REMOVAL

LOWER TERMINAL LAYER FORMATION

RESIST FORMATION

ETCHING

RESIST REMOVAL

MAGNETIC SENSOR AND METHOD OF MANUFACTURING THE SAME

CROSS-REFERENCE TO RELATED APPLICATIONS

This application is based upon and claims priority of Japanese Patent Application No. 2000-044828, filed on Feb. 22, 2000, the contents being incorporated herein by reference.

BACKGROUND OF THE INVENTION

1. Field of the Invention

The present invention relates to magnetic sensors in which a sense current is applied to a magnetosensitive film to sense a change in external magnetic field through a change in resistance value (voltage value) of the film.

2. Description of the Related Art

A magnetic sensor is conventionally used as a recording/reproduction magnetic head of a hard disk drive mounted principally in a computer. This conventional recording/reproduction magnetic head senses an external magnetic field by means of an induced current generated in a coil. Recently, however, with increasing demands on high storage density and high processing speed, a magnetic sensor which senses an external magnetic field itself is often used. This sensor uses the magnetoresistance (MR) effect. Furthermore, a magnetic head using the giant magnetoresistance (GMR) effect has appeared.

As the recording density of a hard disk drive increases, the 1-bit recording area reduces, and the magnetic field generated decreases. The recording densities of currently commercially available hard disk drives are around 10 Gbits/in$^2$. However, the recording density rise nearly doubles every year. This requires a magnetic head to control finer magnetic fields and sense smaller changes in external magnetic field.

At present, a spin valve type GMR film is used. This spin valve GMR film has a magnetic layer whose magnetization direction is fixed and a magnetic layer whose magnetization direction can freely change. The electrical resistance changes in accordance with the angle that the magnetization directions in these two magnetic layers make.

When this magnetic head is used, a sense current is made to flow in parallel with the film surface of the GMR film and sensed as a change in the resistance value (the voltage value: the output value) resulting from the external magnetic field. In this magnetic head having a CIP (Current In the Plane) structure in which a sense current is supplied in parallel with the film surface of the GMR film, the output value lowers when the element width (accurately, the effective core width) decreases. If the sense current amount is increased, a large output value is obtained by the Ohm's law. However, this sense current amount is limited because the generation of heat or the like is unavoidable.

Also, the CIP magnetic head requires insulating layers between the upper and lower magnetic shields. The distance between the magnetic shields is (thickness of GMR film+ thickness of insulating layer×2). Since the lower limit of the insulating layer thickness is presently 20 nm, the distance between the magnetic shields is (thickness of GMR film+40 nm). If the lengths of recording bits on a recording medium are shortened, it becomes difficult to sense these bits. Therefore, the distance between the magnetic shields cannot be reduced to 40 nm or less at present.

From the foregoing, the CIP magnetic head using the spin valve GMR film can presumably achieve a recording density of up to 20 to 40 Gbits/in$^2$. The upper limit is 60 Gbits/in$^2$ even when the latest technique using specular scattering is applied.

The recording density of hard disk drives is abruptly increasing, so a recording density of 80 Gbits/in$^2$ is probably required in 2002. For the above reasons, it is extremely difficult for the CIP magnetic head using the spin valve GMR film to achieve a high recording density of 80 Gbits/in$^2$ or more.

To solve these problems, a magnetic head which has a CPP (Current Perpendicular to the Plane) structure in which a sense current is supplied in a direction containing at least a component perpendicular to the film surfaces of the MR film is regarded as promising. This magnetic head having the CCP structure shows a resistance change about twice that of the CIP structure at room temperature, so a large output can be expected. In this structure, the GMR film is not restricted to a multilayer GMR film. For example, a spin valve film or a coercive force difference type multilayer film can be used.

Another great advantage of the CPP magnetic head is that the output value increases as the sectional area (=core width of CIP structure×height) of a portion of the GMR film through which a sense current passes decreases. A high output value is obtained by decreasing those surfaces of upper and lower terminals sandwiching the MR film, which oppose the MR film surfaces, by using this property.

The use of a magnetic head having a tunnel MR (TMR) structure in which an insulating layer is sandwiched between two magnetic layers is similarly pursued. In this structure, a tunnel current passing through the insulating layer changes in accordance with the magnetization direction in each magnetic layer. Accordingly, the structure shows a large resistance change and has a high output value. In the magnetic head having this TMR structure, a current flows in the order of magnetic layer→insulating layer→magnetic layer. Additionally, the TMR structure has advantages analogous to those of the CPP structure. Hence, the TMR structure can be regarded as one type of CPP structure.

As described above, the CPP magnetic head is expected to replace the CIP magnetic head. However, this CPP magnetic head has not been put into practical use yet because it has the following several problems.

The following problems are particularly notable when the sizes of those surfaces of the upper and lower terminals, which oppose the GMR film surfaces, are decreased to further increase the output of the CPP structure magnetic head.

(1) Element fabrication processes are complicated and require high accuracy.

A series of processes of film formation, resist formation, photolithography, etching, and resist removal must be performed several times. In particular, when the sizes of the opposing surfaces of the upper and lower terminals are to be decreased, it is essential to form insulating layers corresponding to the two terminals. This formation is very cumbersome and time-consuming. Additionally, in this case those portions of the opposing surfaces of these upper and lower terminals, which overlap correspond to a CPP portion which contributes to the output. Hence, an extremely high alignment accuracy is necessary in resist formation, and this makes a desired output very difficult to obtain.

(2) The characteristics are difficult to evaluate unless the size of the CCP portion is around 1 µm or on the order of submicrons.

If the size of the CCP portion is 3 µm or more, a voltage with respect to a sense current is measured as a negative value owing to the influence of the current distribution, although this also depends on the element structure, material, and the like. Under this influence, the MR ratio takes a very large value around 3 µm. This prevents the application of the conventional evaluation standards.

(3) The characteristics are readily influenced by the quality of element fabrication processes.

Although this is also a problem of the magnetic head having the CIP structure, the problem is more notable in the CPP structure. When a GMR film and insulating layers are formed, the MR characteristics largely change in accordance with the sectional shape and the condition of burrs produced. This makes it difficult to specify the cause of a defective product.

SUMMARY OF THE INVENTION

It is an object of the present invention to provide a magnetic sensor which uses a CCP structure to increase the output and is yet readily processible and which can substantially accurately implement a fine CPP structure in accordance with a desired output.

It is another object of the present invention to provide a magnetic sensor and a method of manufacturing the same which can accurately control the shape and dimensions of a CCP portion to desired fine values and can further increase the output and improve the characteristics.

According to the first aspect of the present invention, a magnetic sensor comprises a magnetically magnetosensitive film so as to fall within the area of the film surface.

According to the third aspect of the present invention, provided is a manufacturing method of a magnetic sensor in which a magnetosensitive film for sensing an external magnetic field is vertically sandwiched by a pair of terminals to apply an electric current to the magnetosensitive film in a direction perpendicular to a film surface of the magnetosensitive film. The method comprises the steps of forming one of the terminals such that a surface of it is opposed to the magnetosensitive film so as to include the whole area of the film surface, forming the other of the terminals such that a surface of it is smaller in area than the film surface and opposed to the magnetosensitive film so as to fall within the area of the film surface, and the other of the terminals has a predetermined shape in a section perpendicular to the film surface and parallel to a magnetosensitive surface, said shape having its width changing from one portion to another, and polishing an end surface that is to serve as the magnetosensitive film, so as to control the width of the other of the terminals exposed on the end surface.

According to the fourth aspect of the present invention, provided is a read magnetic head comprising the magnetic sensor according to the first aspect for reading information stored in a magnetic recording medium.

According to the fifth aspect of the present invention, provided is a read/write magnetic head in which a read magnetic head comprising the magnetic sensor according to the first aspect for reading information stored in a magnetic recording medium is integrated with a write magnetic head for writing information into the magnetic recording medium.

According to the sixth aspect of the present invention, provided is a magnetic apparatus equipped with a read/write magnetic head in which a read magnetic head comprising the magnetic sensor according to the first aspect for reading information stored in a magnetic recording medium is integrated with a write magnetic head for writing information into the magnetic recording medium.

In a magnetic sensor having a CPP structure of the present invention, the opposing surface of one terminal has a size including a film surface of a magnetosensitive film, whereas the opposing surface of the other terminal is smaller than and included in this film surface. The size of a portion of the magnetosensitive film through which a current flows, i.e., the size of a CPP portion is substantially independent of the size of the opposing surface of one terminal as a larger terminal, and primarily defined by the size of the opposing surface of the other terminal as a smaller terminal. So, determining this size presumably substantially uniquely determines the output value. Accordingly, even when the size of the opposing surface of one terminal is formed to be the same as or larger than the film surface, the output value is not substantially influenced. When one terminal is set in this way, the two terminals need not be aligned with high accuracy and can be formed very easily. Additionally, a desired high output value can be obtained by forming (the opposing surface) of the other terminal into a very small size.

Furthermore, in the present invention the other terminal has a predetermined shape whose width in a section perpendicular to the film surface and parallel to a magnetic sensitive surface changes from one portion to another in the section. More specifically, the predetermined shape is a relatively simple shape such as a triangle, a trapezoid, or a circle. Also, the magnetic sensitive surface is polished during the manufacture. Since the polishing amount and the element width uniquely correspond to each other, it is possible to easily and accurately control a desired fine element width depending on this shape.

The present invention realizes a magnetic sensor which uses a CPP structure and is yet readily processible and which includes a substantially accurate fine CPP structure in accordance with a desired output.

Furthermore, the shape and dimensions of a CPP portion can be accurately controlled to desired fine values. This can further increase the output and improve the characteristics.

DETAILED DESCRIPTION OF THE PREFERRED EMBODIMENTS

Hereinafter, preferred embodiments of the present invention will be described in detail with reference to the accompanying drawings.

First Embodiment

This embodiment exemplifies the construction of a magnetic sensor having a CPP structure in which a sense current is supplied in a direction containing at least a component perpendicular to the film surfaces of a magnetosensitive film, and a method of manufacturing the sensor.

Figure 1:
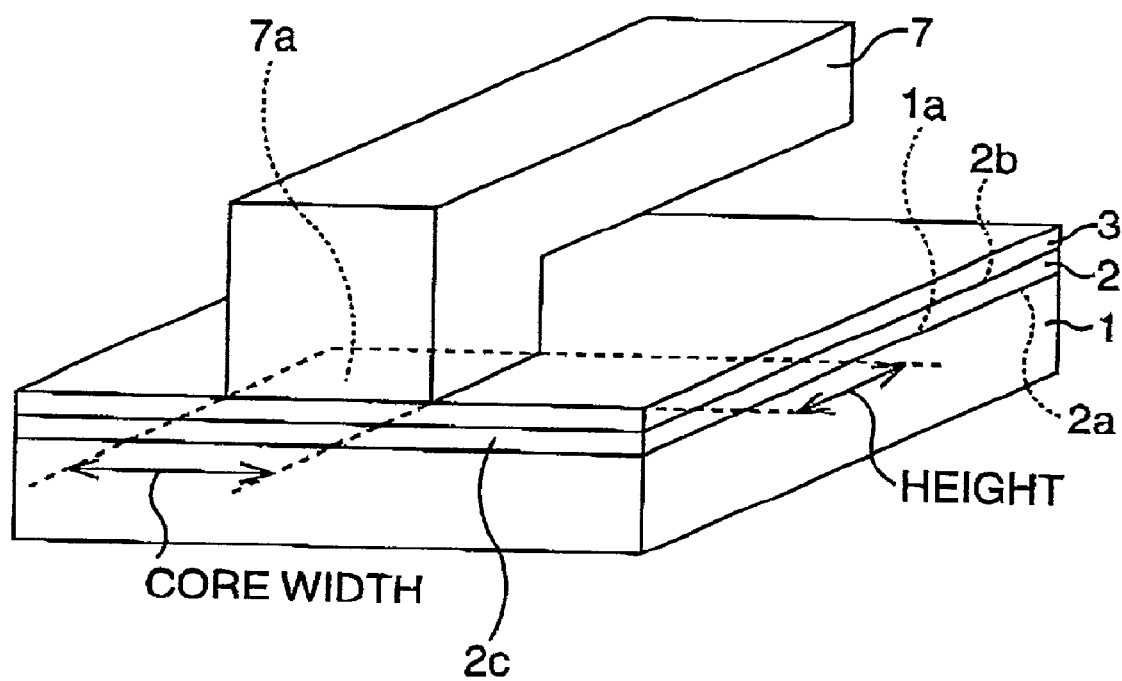
FIG. 1 is a schematic perspective view showing only the major components of a magnetic sensor according to the first embodiment of the present invention.

FIG. 1 is a schematic perspective view showing only the main components of the magnetic sensor according to this embodiment.

This magnetic sensor includes a magnetosensitive film 2 for sensing an external magnetic field, a cover layer 3 which is made of Ru or the like and covers the magnetosensitive film 2, and a pair of lower and upper terminal layers 1 and 7. These lower and upper terminal layers 1 and 7 vertically sandwich the magnetosensitive film 2 and supply a current in a direction perpendicular to the film surfaces (opposing surfaces 2a and 2b) of this magnetosensitive film 2.

The magnetosensitive film 2 can be a multilayer GMR film, a spin valve film, a coercive force difference type multilayer film, or the like. In this embodiment, the cover film 3 is formed on this magnetosensitive film 2. However, the upper terminal layer 7 is, of course, magnetically in contact with (magnetically connected to) the magnetosensitive film 2 via the cover film 3.

In this embodiment, the lower terminal layer 1, the magnetosensitive film 2, and the cover film 3 are simultaneously patterned into substantially the same size. An opposing surface 1a of the lower terminal layer 1, which opposes the magnetosensitive film 2 is substantially superposed on the opposing surface 2a of the magnetosensitive film 2.

An opposing surface 7a of the upper terminal layer 7, which opposes the magnetosensitive film 2 is formed into a shape which is smaller than and included in the opposing surface 2b of the magnetosensitive film 2.

In this magnetic sensor, the size of a portion of the magnetosensitive film 2 through which a current passes, i.e., the size of a CPP portion is substantially independent of the size of the lower terminal layer 1 as a larger terminal. That is, the size of this CPP portion is defined by the size of the opposing surface 7a of the upper terminal layer 7 as a smaller terminal. Therefore, the output value is presumably substantially uniquely determined by determining the size of the opposing surface 7a. Strictly speaking, however, the size of the CPP portion is not determined only by the size of the opposing surface 7a. This CCP portion is probably larger by a few % than the opposing surface 7b when the specific resistances and thicknesses of the upper and lower terminal layers 7 and 1 and the magnetosensitive film 2 and the influence of the lower terminal layer 1 are taken into consideration. However, an error to this extent is within a negligible range, so it is reasonable to regard the opposing surface 2b as having substantially the same size as the CPP portion.

In this structure, the width and height of the opposing surface 7a of the upper terminal layer 7 are the core width and height (shown as CORE WIDTH and HEIGHT in FIG. 1 for convenience) of a common magnetic head for read. The optical core width and effective core width of a common read magnetic head have a slight difference. When this is considered, the method of defining the CPP portion in this embodiment is proper.

Accordingly, even when the opposing surface 1a of the lower terminal layer 1 is formed into the same size as the opposing surface 2a of the magnetic sensitive layer 2 as described above, the output value is substantially not influenced. Since the lower terminal layer 1 is designed in this way, the two terminals need not be aligned with high accuracy and hence can be formed very easily. In addition, a desired high output value can be obtained because the opposing surface 7b of the upper terminal layer 7 is formed into a very small size.

Although the cover layer 3 is used in this embodiment, it is not an essential component and need not be used if unnecessary.

A method of manufacturing the magnetic sensor according to this embodiment will be described below.

FIGS. 2A to 7D are schematic plan and sectional views showing a manufacturing process of this sensor in the order of manufacturing steps. FIGS. 5A to 7D show sections taken along broken lines I–I' in FIGS. 2A to 4D, respectively.

Figure 2A:
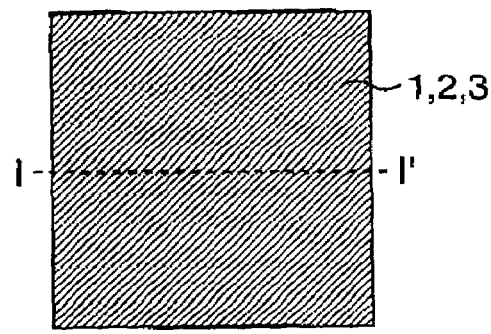
FIGS. 2A to 2D are schematic plan views showing a manufacturing process of the magnetic sensor of the first embodiment in the order of manufacturing steps.
Figure 5A:
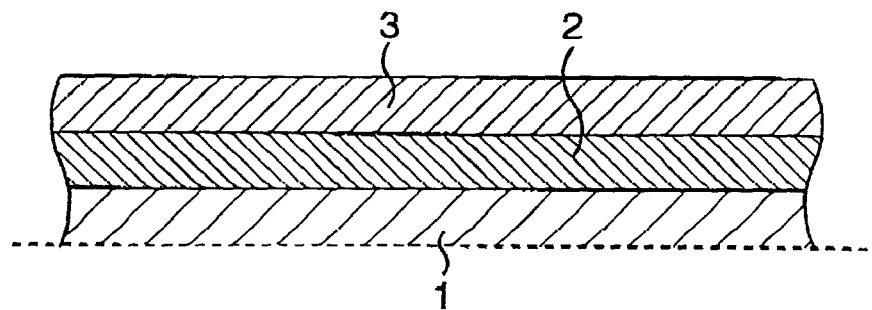
FIGS. 5A to 5D are schematic sectional views showing a manufacturing process of the magnetic sensor of the first embodiment in the order of manufacturing steps.

First, as shown in FIGS. 2A and 5A, a lower terminal layer 1 is formed using Cu, NiFe, or the like, a magnetosensitive film 2 is formed by stacking CoFe/Cu or the like, and a cover layer 3 is formed using Ru or the like, in the order named.

Figure 2B:
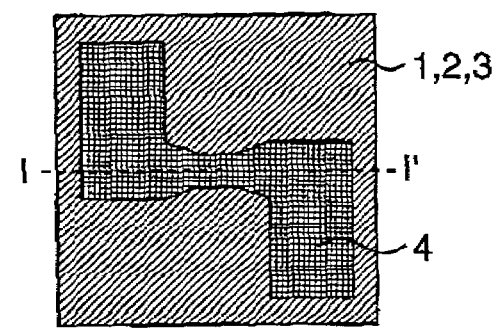
Figure 5B:
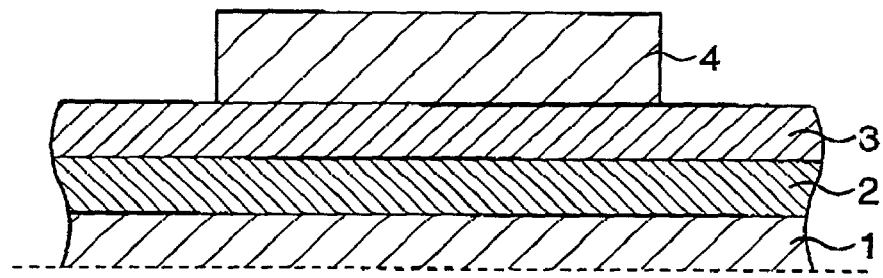

Subsequently, as shown in FIGS. 2B and 5B, the cover layer 3 is coated with a photoresist 4, and this photoresist 4 is processed into a desired shape by photolithography.

Figure 2C:
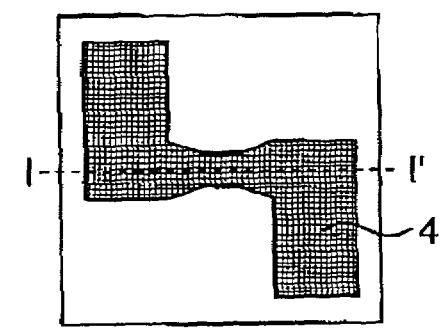
Figure 5C:
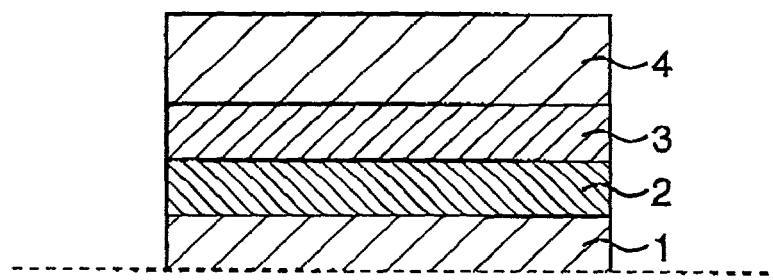

As shown in FIGS. 2C and 5C, the photoresist 4 is used as a mask to pattern continuously the lower terminal layer 1, the magnetosensitive film 2, and the cover layer 3 by ion milling or reactive ion etching (RIE).

Figure 2D:
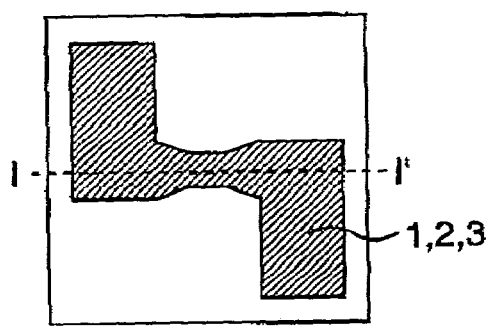
Figure 5D:
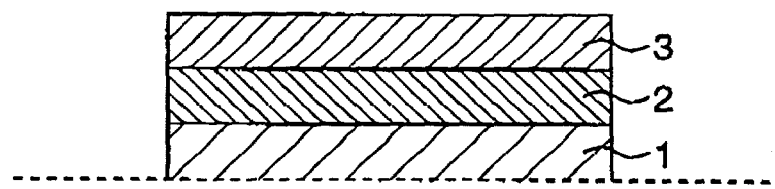

As shown in FIGS. 2D and 5D, the photoresist 4 is removed using an organic solvent or a stripping solution. More favorable removal is possible when ashing or the like is additionally performed.

Figure 3A:
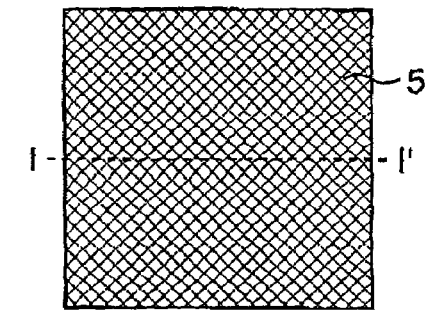
FIGS. 3A to 3D are schematic plan views showing a manufacturing process of the magnetic sensor of the first embodiment in the order of manufacturing steps, subsequent to FIG. 2D.
Figure 6A:
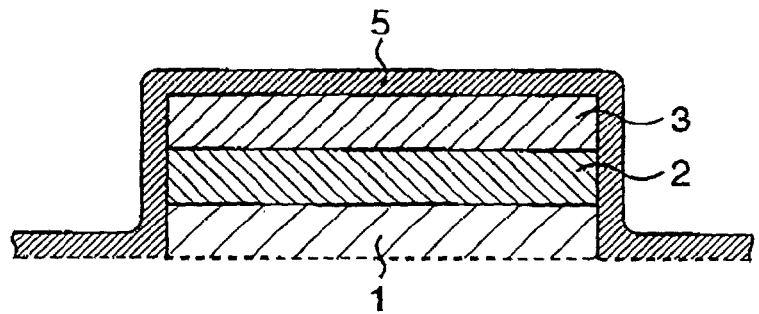
FIGS. 6A to 6D are schematic sectional views showing a manufacturing process of the magnetic sensor of the first embodiment in the order of manufacturing steps, subsequent to FIG. 5D.

As shown in FIGS. 3A and 6A, an insulating layer 5 made of, e.g., $SiO_2$ is formed on the entire surface so as to cover the patterned lower terminal layer 1, magnetosensitive film 2, and cover layer 3.

Figure 3B:
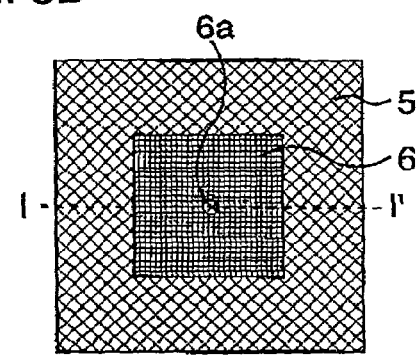
Figure 6B:
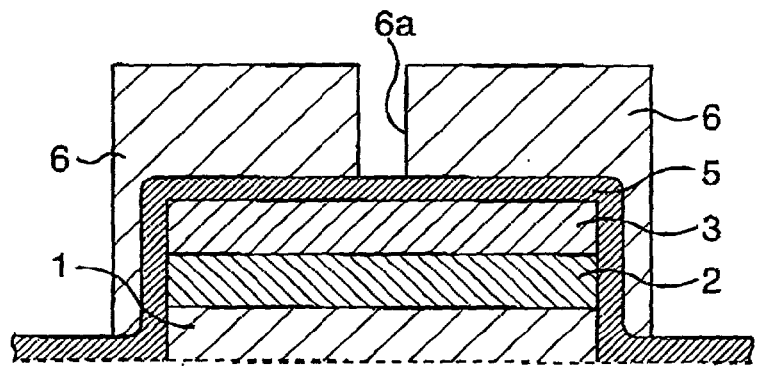

As shown in FIGS. 3B and 6B, the insulating layer 5 is coated with a photoresist 6, and this photoresist 6 is patterned by photolithography. More specifically, the photoresist 6 is processed into a shape including at least the underlying lower terminal layer 1, magnetosensitive film 2, and cover layer 3 and having a hole 6a in a substantially central portion.

Figure 3C:
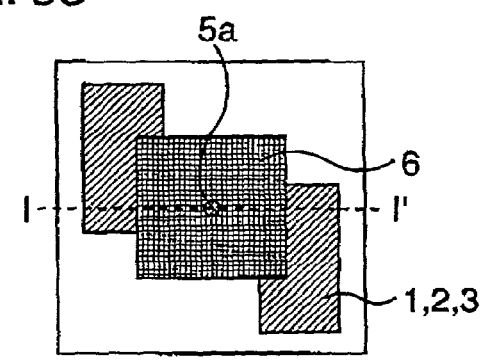
Figure 6C:
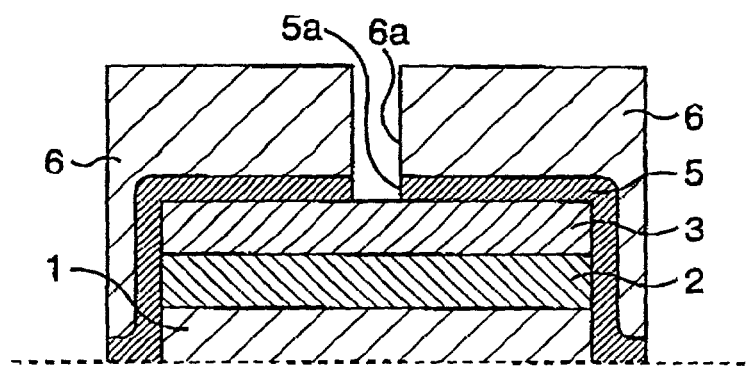

Subsequently, as shown in FIGS. 3C and 6C, this photoresist 6 is used as a mask and the cover layer 3 as an etching stopper to pattern only the insulating layer 5 by ion milling or RIE. Consequently, the insulating layer 5 remains in the form of an island, and a hole 5a in which a portion of the cover layer 3 is exposed is formed in a substantially central portion.

Figure 3D:
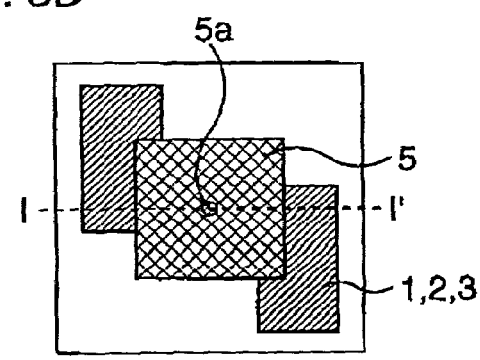
Figure 6D:
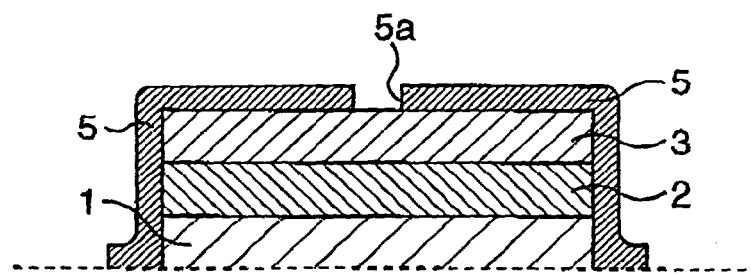

As shown in FIGS. 3D and 6D, the photoresist 6 is removed using an organic solvent or a stripping solution. More favorable removal is possible when ashing or the like is additionally performed.

Figure 4A:
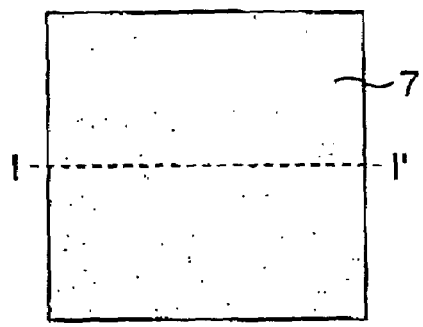
FIGS. 4A to 4D are schematic plan views showing a manufacturing process of the magnetic sensor of the first embodiment in the order of manufacturing steps, subsequent to FIG. 3D.
Figure 7A:
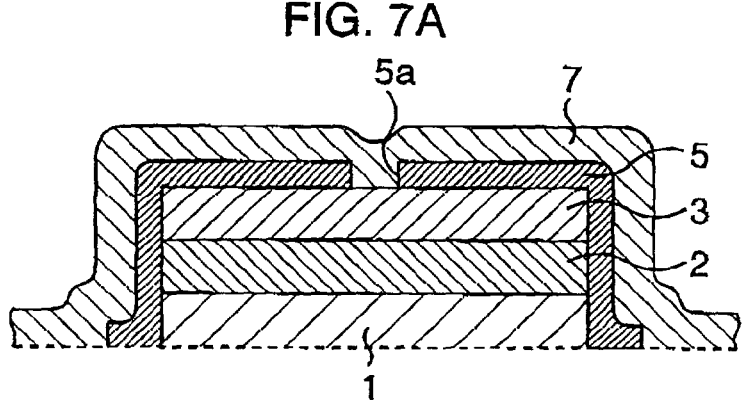
FIGS. 7A to 7D are schematic sectional views showing a manufacturing process of the magnetic sensor of the first embodiment in the order of manufacturing steps, subsequent to FIG. 6D.

As shown in FIGS. 4A and 7A, an upper terminal layer 7 made of, e.g., Cu or NiFe is formed to cover the entire surface.

Figure 4B:
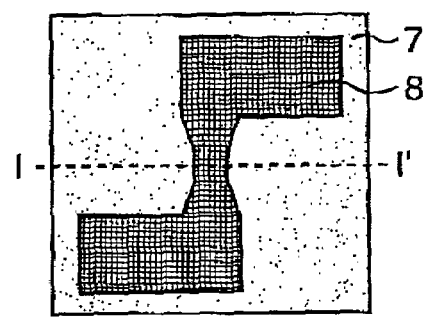
Figure 7B:
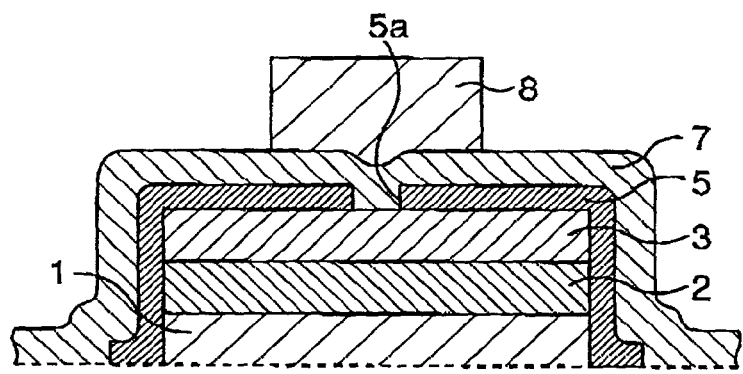

As shown in FIG. 4B and 7B, a photoresist 8 is formed on the upper terminal layer 7 and processed into a desired shape by photolithography.

Figure 4C:
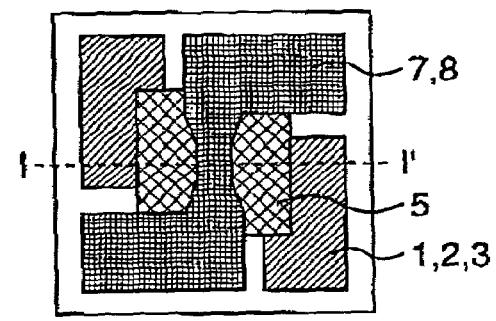
Figure 7C:
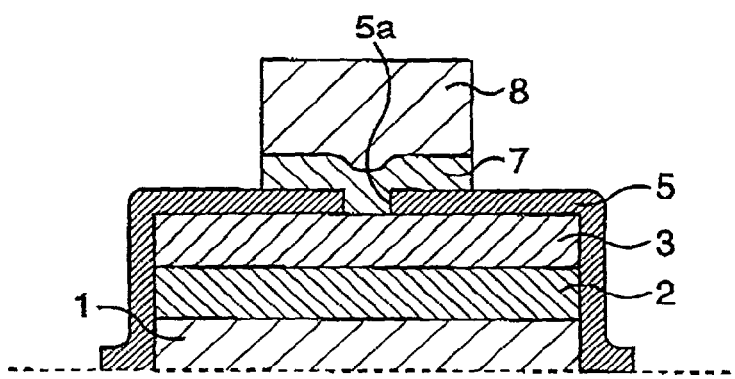

As shown in FIGS. 4C and 7C, this photoresist 8 is used as a mask to pattern the upper terminal layer 7 by ion milling or reactive ion etching (RIE).

Figure 4D:
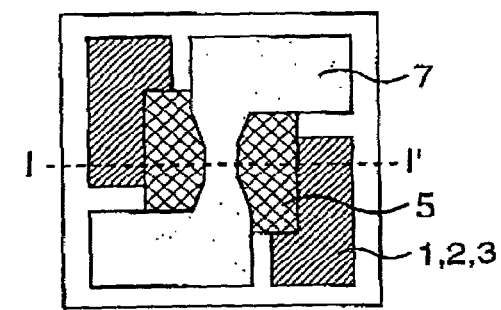
Figure 7D:
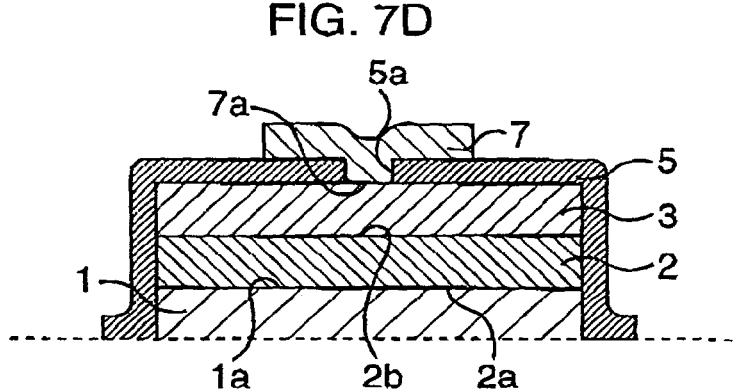

As shown in FIGS. 4D and 7D, the photoresist 8 is removed using an organic solvent or a stripping solution. More favorable removal is possible when ashing or the like is additionally performed.

Through the above process, the magnetosensitive film 2 is brought into magnetic contact with the lower terminal layer 1, since the opposing surface 2a as a lower surface in FIG. 7D substantially overlaps the opposing surface 1a of the lower terminal layer 1. In addition, the magnetosensitive film 2 is brought into magnetic contact with the upper terminal layer 7 via the cover layer 3, because the opposing surface 7a of the upper terminal layer 7 is included in the opposing surface 2b as an upper surface in FIG. 7D. As described previously, a CPP portion is defined principally by the opposing surface 7a of the upper terminal layer 7 (and that portion of the opposing surface 2b, which opposes this opposing surface 7a).

In this embodiment as described above, the lower terminal layer 1, the magnetosensitive film 2, and the cover layer 3 are formed by performing patterning once. Therefore, the basic configuration of the magnetic sensor can be manufactured by performing a series of patterning steps, including film formation, resist formation, film processing, and resist removal, only three times. In contrast, to form the lower terminal layer such that its opposing surface is smaller than the opposing surface of the magnetosensitive film, the series of patterning steps must be further performed at least four times. Additionally, in this case an extremely high accuracy is required in alignment of the upper and lower terminal layers. In this embodiment, however, the upper and lower terminal layers 7 and 1 and the magnetosensitive film 2 have larger areas than the hole 5a. This eliminates the need for high accuracy, so an accuracy obtained by a common exposure apparatus (stepper) is satisfactory.

The size of the lower terminal layer 1 has almost no influence on definition of the CPP portion. Therefore, the manufacturing method of this embodiment can greatly reduce the number of manufacturing steps and simplify the manufacturing steps, and contributes to implementation of a high-performance, fine magnetic sensor.

As has been explained above, this embodiment can implement a magnetic sensor which uses a CCP structure and is yet readily processible and which includes a substantially accurate fine CPP structure in accordance with a desired output.

Second Embodiment

In this embodiment, a magnetic sensor having a CPP structure similar to that of the first embodiment will be explained. The difference from the first embodiment is in shape of an upper terminal layer.

Figure 8:
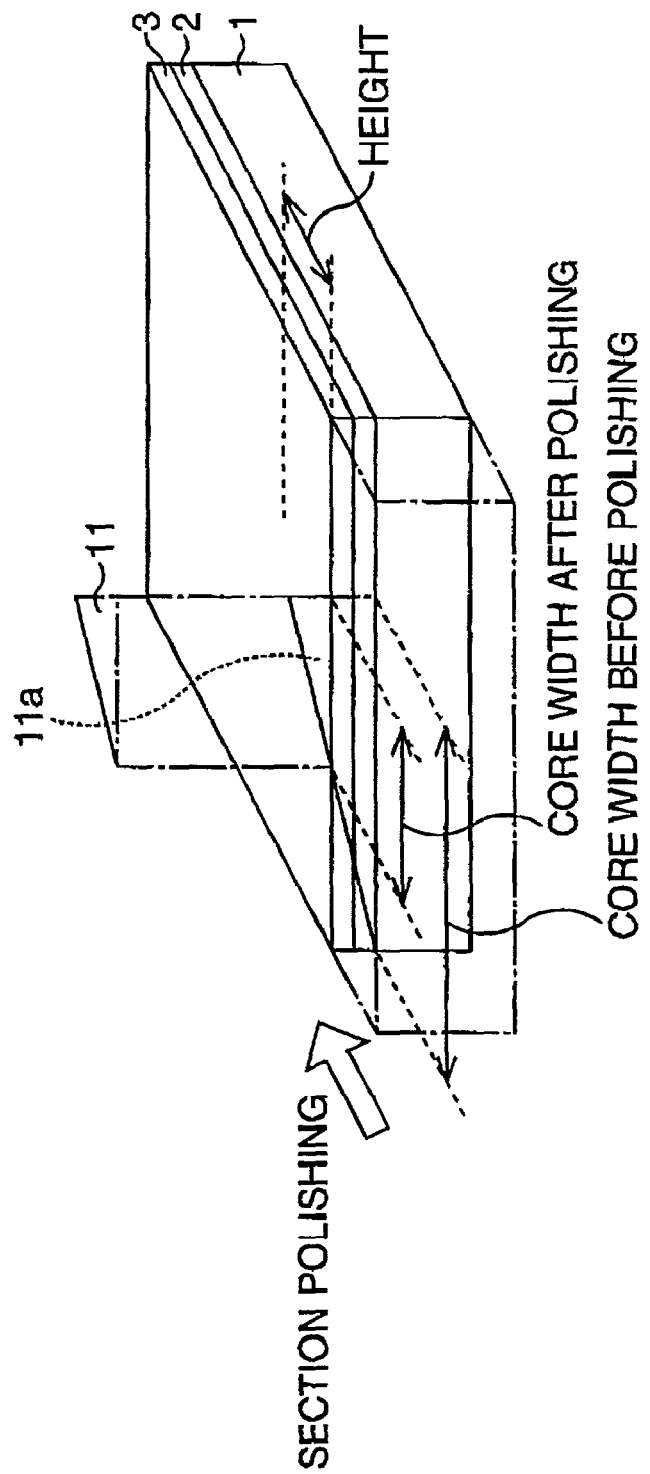
FIG. 8 is a schematic perspective view showing only the major components of a magnetic sensor according to the second embodiment of the present invention.

FIG. 8 is a schematic perspective view showing only the major components of a magnetic sensor according to this embodiment.

In this magnetic sensor, an upper terminal layer 11 has a predetermined shape whose width in section perpendicular to an opposing surface 2b and parallel to a magnetic sensitive surface 2c of a magnetosensitive film 2 changes from one portion to another in section. More specifically, this predetermined shape is preferably a relatively simple shape such as a triangle, a trapezoid, or a circle. In this embodiment, a triangular shape is used.

In the manufacturing process of this magnetic sensor, the element width (shown as CORE WIDTH in FIG. 8) of the magnetosensitive film 2 exposed in the magnetic sensitive surface 2c can be controlled to a desired very small value.

Figure 9A:
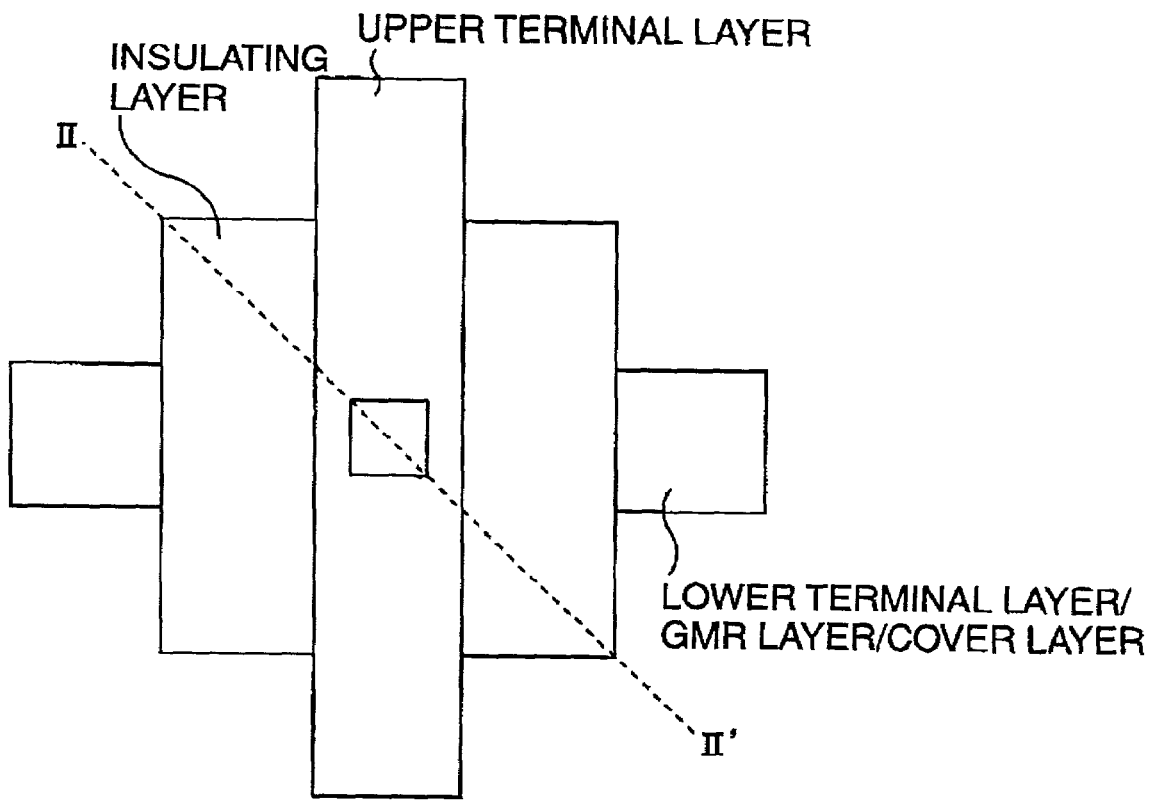
FIGS. 9A and 9B are schematic plan views showing a manufacturing process of the magnetic sensor of the second embodiment in the order of manufacturing steps.

More specifically, as shown in FIG. 9A, a lower terminal layer 1, a magnetic sensitive layer 2, a cover layer 3, an insulating layer 5, and an upper terminal layer 7 are formed by patterning through a process similar to that of the first embodiment.

Figure 9B:
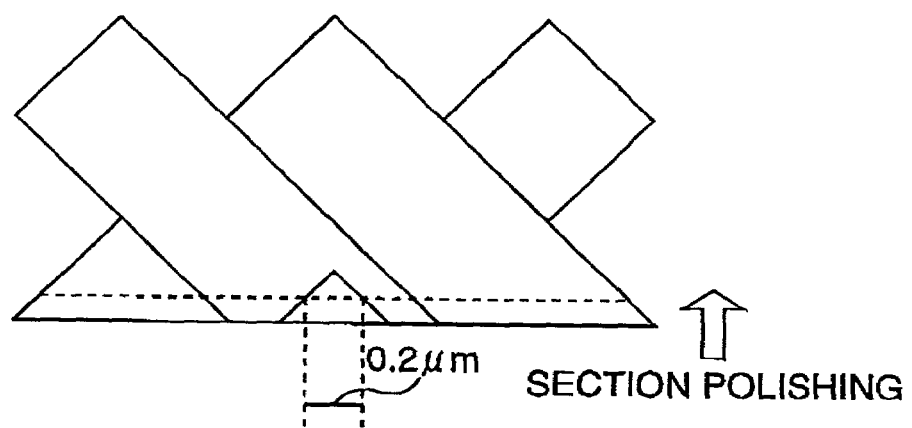

As shown in FIG. 9B, the resultant structure is roughly polished along a broken line II–II' until the portion corresponding to this line is exposed.

Subsequently, as shown in FIGS. 8 and 9B, the section is further precisely polished.

Since the polishing amount and the element width uniquely correspond to each other, a desired fine element width depending on this triangular shape can be easily and accurately controlled.

In effect, in the above first embodiment it is difficult to decrease further the size of a hole 6a in the photoresist 6 in order to form a hole 5a in the insulating layer 5. For example, even for an i-line stepper capable of achieving a line width of 0.25 μm in the formation of lines and spaces, about 0.4 μm is probably a limit in the formation of fine holes.

In this embodiment, however, it is readily possible, by polishing the upper terminal layer 11 having the above shape, to achieve an element width of 0.2 μm or less (0.2 μm is shown in FIG. 9B) exceeding the exposure limit in hole formation.

If the upper terminal layer 7 has a predetermined shape whose width in section perpendicular to the opposing surface 2b and parallel to the magnetic sensitive surface 2c of the magnetosensitive film 2 remains unchanged regardless of a portion in section as in the first embodiment described above, such a fine element width as in this embodiment is probably difficult to achieve. However, the above first embodiment has the advantage that no such processing accuracy as in this embodiment is necessary in the formation of the upper terminal layer 7.

As has been explained above, this embodiment can implement a magnetic sensor which uses a CPP structure and is yet readily processible and which includes a substantially accurate fine CPP structure in accordance with a desired output.

Furthermore, the shape and dimensions of the CPP portion can be accurately and desirably controlled.

Third Embodiment

This embodiment exemplifies magnetic sensors having a CPP structure analogous to that of the first embodiment. The difference from the first embodiment is in that these magnetic sensors have a magnetic domain control function and a bias application function.

Figure 10:
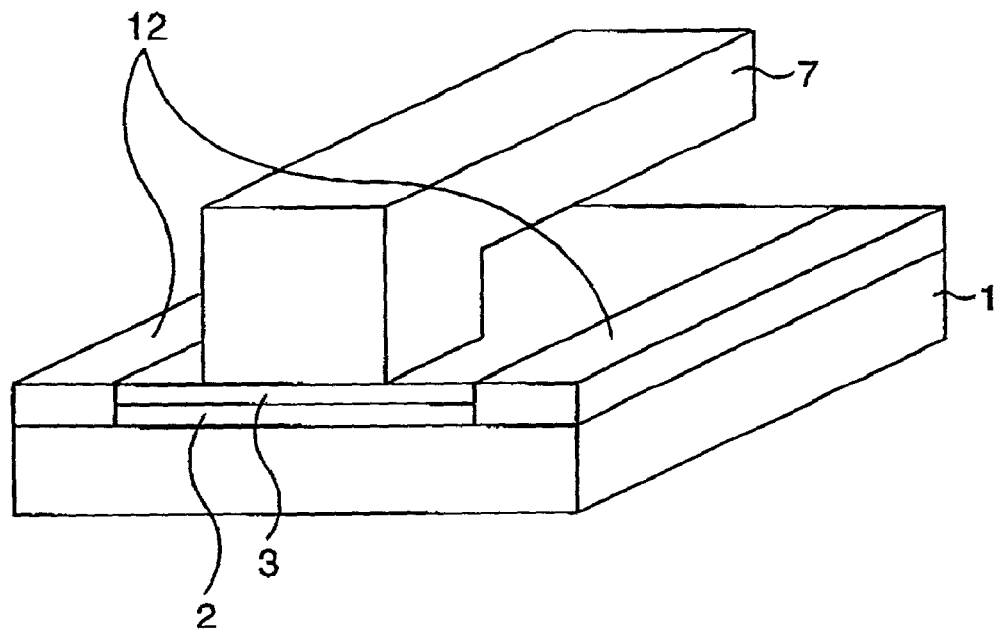
FIG. 10 is a schematic perspective view showing only the major components of a magnetic sensor according to the third embodiment of the present invention.
Figure 11:
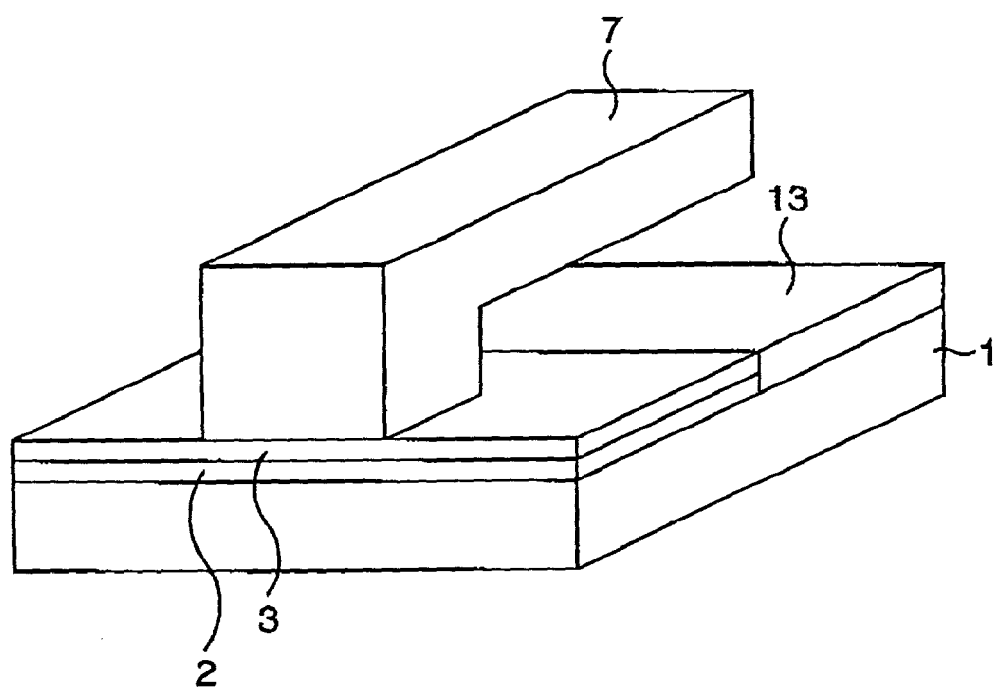
FIG. 11 is a schematic perspective view showing only the major components of another magnetic sensor according to the third embodiment.

FIGS. 10 and 11 are schematic perspective views showing only the main components of the magnetic sensors according to this embodiment.

In the magnetic sensor shown in FIG. 10, a magnetosensitive film 2 and a cover film 3 are made smaller than a lower terminal layer 1. A film 12 having a magnetic domain control function is formed to be connected to the magnetosensitive film 2 and the cover film 3 in two side portions on the lower terminal layer 1.

In the magnetic sensor shown in FIG. 11, a magnetosensitive film 2 and a cover film 3 are made smaller than a lower terminal layer 1. A film 13 having a bias application function is formed to be connected to the magnetosensitive film 2 and the cover film 3 in one end portion on the lower terminal layer 1.

To manufacture these magnetic sensors, after the lower terminal layer 1 is formed by patterning, the magnetosensitive film 2 and the cover film 3 are patterned. In this patterning, it is also possible to form previously an Au film or the like on the surface of the lower terminal layer 1 and use this Au film or the like as an etching stopper. After the film 12 having a magnetic domain control function or the film 13 having a bias application function is patterned, an insulating layer 5 and an upper terminal layer 7 are patterned in the same manner as in the first embodiment.

The material of the film 12 having a magnetic domain control function and the film 13 having a bias application function is preferably a hard magnetic material or an antiferromagnetic material.

When a magnetic sensor is actually applied to a read magnetic head, the above functions are often required.

When this is the case, the upper and lower terminal layers 7 and 1 are partially or entirely formed by a soft magnetic material to allow these upper and lower terminal layers 7 and 1 to function also as magnetic shielding layers. Consequently, the magnetic shielding spacing can be greatly decreased in comparison with the conventional CIP magnetic head.

Fourth Embodiment

This embodiment exemplifies a magnetic apparatus equipped with a composite magnetic head obtained by integrating a read magnetic head for reading out stored information from an information storage medium and a write magnetic head (an inductive head). The read magnetic head is one of the magnetic sensors described in the first to third embodiments. In this embodiment, this magnetic apparatus will be described by taking a hard disk drive using a hard disk as an information storage medium as an example.

Figure 12:
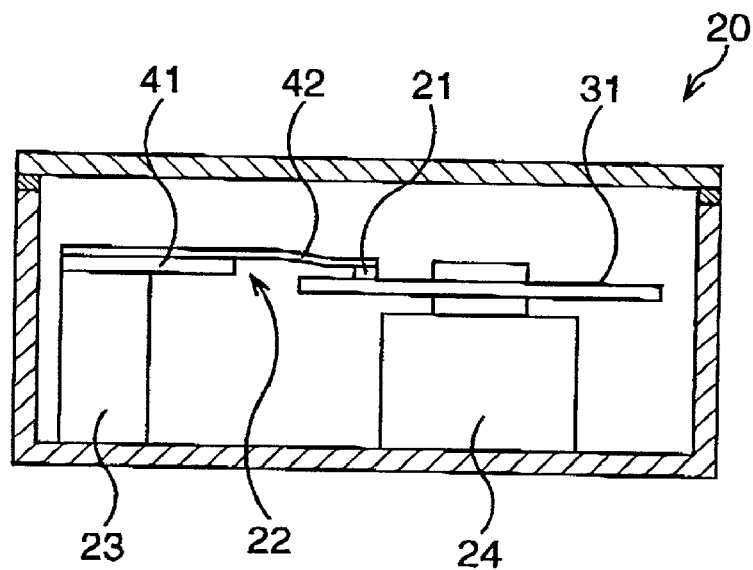
FIG. 12 is a schematic side view showing the major components of a hard disk drive according to the fourth embodiment of the present invention.
Figure 13:
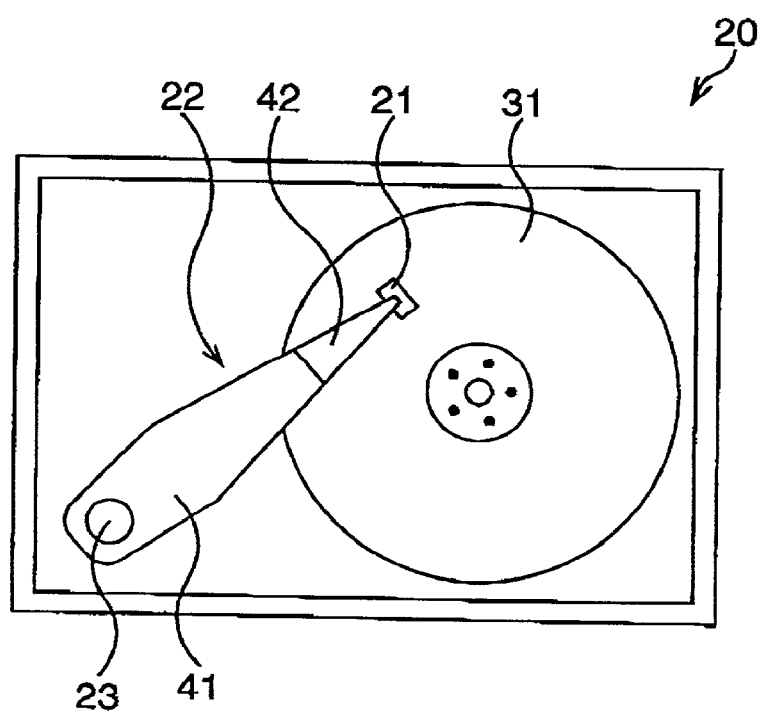
FIG. 13 is a schematic plan view showing the main components of the hard disk drive according to the fourth embodiment.

FIG. 12 is a schematic side view showing the major components of the hard disk drive according to this embodiment. FIG. 13 is a schematic plan view showing the main components of this hard disk drive.

This hard disk drive 20 comprises a slider 21 for holding a composite magnetic head, a head supporting mechanism 22 for supporting the slider 22, an actuator 23 for tracking a read magnetic head via the head supporting mechanism 22, and a disk driving motor 24 for rotating a disk 31. The head supporting mechanism 22 includes an arm 41 and a suspension 42.

Figure 14:
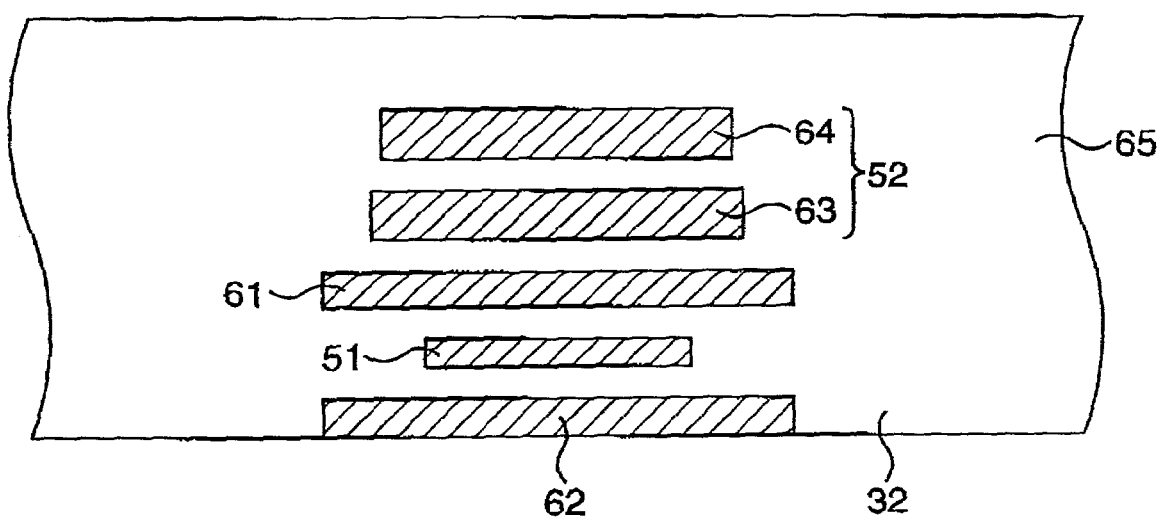
FIG. 14 is a schematic side view showing the main components of a composite magnetic head viewed from an ABS surface.

FIG. 14 is a schematic side view showing the main components of the composite magnetic head viewed from an ABS surface 32.

This composite magnetic head is formed by stacking a read magnetic head 51 which is one of the magnetic sensors described in the first to third embodiments, and a write magnetic head 52. More specifically, upper and lower shielding layers 61 and 62 serving as magnetic shields are formed above and below the read magnetic head 51. Lower and upper poles 63 and 64 constituting the write magnetic head 52 are formed in this order on the upper shielding layer 61. These members are formed in an aluminum protective layer 65 to construct the composite magnetic head.

In this composite magnetic head, a magnetic sensitive surface 2C is an ABS surface, and the core width and height are defined as shown in, e.g., FIGS. 1 and 8.

The disk driving motor 24 rotates the disk 31 at a predetermined speed. In order for the composite magnetic head to access a predetermined data track on the disk 31, the actuator 23 moves the slider 21 holding this composite magnetic head in the radial direction across the surface of the disk 31. This actuator 23 is typically a linear or rotary voice coil motor.

The slider 21 is, e.g., an air bearing slider. When the hard disk drive 20 is activated or stopped, this slider 21 comes into contact with the surface of the disk 31. When information is to be reproduced from the hard disk drive 20, the slider 21 is kept on the surface of the disk 31 by an air bearing formed between the rotating disk 31 and the slider 21. The read magnetic head held by the slider 21 writes information in and reads out information from the disk 31.

This embodiment can implement a magnetic sensor which uses a CCP structure and is yet readily processible and which includes a substantially accurate fine CPP structure in accordance with a desired output. Also, by constructing a hard disk drive by using this magnetic sensor as a read magnetic head of a composite magnetic head for writing and reading out information, this embodiment can achieve a high recording density and further miniaturize the apparatus.

Indeed, use of a hard disk drive in which a magnetic sensor according to, e.g., the second embodiment is employed as the read magnetic head sufficiently meets a high density recording more than 100 Gbits/in$^2$.

In this embodiment, the magnetic sensor described in any one of the first to third embodiments is used as a read magnetic head of a composite magnetic head. However, this magnetic sensor can also be used as a separate read magnetic head.

Experimental Result

Various experimental results for explaining the present invention in more detail will be given below.

Experimental Example 1

The magnetic sensor described in the first embodiment was manufactured under the following conditions, and its resistance value and resistance change amount were measured.

Lower terminal layer (Cu: 500 nm), magnetosensitive film (CoFe: 11 nm/Cu: 21 nm×10), cover layer (Ru: 5 nm), insulating layer (SiO$_2$: 50 nm), and upper terminal layer (Cu: 500 nm)

When the magnetic sensor was manufactured as above, the shape of a CPP portion was a square of 1×1 µm². This magnetic sensor had a resistance value of 15 mΩ and a resistance change amount of 2.5 mΩ.

Subsequently, as described in the second embodiment, the section of this magnetic sensor was polished to form the upper terminal layer into a triangular shape so that the element width of the CPP portion was 0.2 µm.

The resultant magnetic sensor had a resistance value of 1,500 mΩ and a resistance change amount of 120 mΩ (note that after the section polishing a large resistance value was detected because the measurement was done by using a two-terminal method).

Experimental Example 2

The magnetic sensor described in the first embodiment was manufactured under the following conditions, and its resistance value and resistance change amount were measured.

Lower terminal layer (NiFe: 100 nm/Cu: 10 nm), magnetosensitive film (CoFe: 11 nm/Cu: 21 nm×10), cover layer (Ru: 5 nm), insulating layer (SiO$_2$: 50 nm), and upper terminal layer (Cu: 10 nm/NiFe: 50 nm)

When the magnetic sensor was manufactured as above, the shape of a CPP portion was a square of 1×1 µm². This magnetic sensor had a resistance value of 20 mΩ and a resistance change amount of 2.4 mΩ.

Subsequently, as described in the second embodiment, the section of this magnetic sensor was polished to form the upper terminal layer into a triangular shape so that the element width of the CPP portion was 0.2 µm.

The resultant magnetic sensor had a resistance value of 3,000 mΩ and a resistance change amount of 115 mΩ.

What is claimed is:

1. A magnetic sensor comprising:
   a magnetosensitive film for sensing an external magnetic field; and
   a pair of terminals that vertically sandwich said magnetosensitive film for applying an electric current to said magnetosensitive film in a direction perpendicular to a film surface of said magnetosensitive film,
   one of said terminals having a surface that is opposed to said magnetosensitive film so as to include the whole area of said film surface,
   while the other of said terminals having a surface that is smaller in area than said film surface and opposed to said magnetosensitive film so as to fall within the area of said film surface.

2. The sensor according to claim 1, wherein said surface of said one of said terminals is larger in area than said film surface.

3. The sensor according to claim 2, further comprising a magnetic domain control member on at least one side in width of said magnetosensitive film.

4. The sensor according to claim 2, further comprising a magnetic bias applying member on one side in height of said magnetosensitive surface of said magnetosensitive film.

5. The sensor according to claim 1, wherein said other of said terminals has a predetermined shape in a section perpendicular to said film surface and parallel to a magnetosensitive surface, said shape having its width changing from one portion to another.

6. The sensor according to claim 1, wherein said other of said terminals has a predetermined shape in a section perpendicular to said film surface and parallel to a magnetosensitive surface, said shape having a uniform width.

7. The sensor according to claim 1, wherein one of said terminals and part or the whole of the other of said terminals are made of a magnetic shielding material.

8. A read magnetic head comprising a magnetic sensor for reading information stored in a magnetic recording medium, said sensor comprising:
   a magnetosensitive film for sensing an external magnetic field; and
   a pair of terminals that vertically sandwich said magnetosensitive film for applying an electric current to said magnetosensitive film in a direction perpendicular to a film surface of said magnetosensitive film,
   one of said terminals having a surface that is opposed to said magnetosensitive film so as to include the whole area of said film surface,
   while the other of said terminals having a surface that is smaller in area than said film surface and opposed to said magnetosensitive film so as to fall within the area of said film surface.

9. The head according to claim 8, wherein said surface of said one of said terminals is larger in area than said film surface.

10. The head according to claim 9, wherein said magnetic sensor further comprises a magnetic domain control member on at least one side in width of said magnetosensitive film.

11. The head according to claim 9, wherein said magnetic sensor further comprises a magnetic bias applying member on the opposite side of a magnetosensitive surface of said magnetosensitive film.

12. The head according to claim 8, wherein said other of said terminals has a predetermined shape in a section perpendicular to said film surface and parallel to a magnetosensitive surface, said shape having its width changing from one portion to another.

13. The head according to claim 8, wherein said other of said terminals has a predetermined shape in a section perpendicular to said film surface and parallel to a magnetosensitive surface, said shape having a uniform width.

14. The head according to claim 8, wherein one of said terminals and part or the whole of the other of said terminals are made of a magnetic shielding material.

15. A read/write magnetic head in which a read magnetic head comprising a magnetic sensor for reading information stored in a magnetic recording medium is integrated with a write magnetic head for writing information into said magnetic recording medium,
    said sensor comprising:
    a magnetosensitive film for sensing an external magnetic field; and
    a pair of terminals that vertically sandwich said magnetosensitive film for applying an electric current to said magnetosensitive film in a direction perpendicular to a film surface of said magnetosensitive film,
    one of said terminals having a surface that is opposed to said magnetosensitive film so as to include the whole area of said film surface,
    while the other of said terminals having a surface that is smaller in area than said film surface and opposed to said magnetosensitive film so as to fall within the area of said film surface.

16. The head according to claim 15, wherein said surface of said one of said terminals is larger in area than said film surface.

17. The head according to claim 16, wherein said magnetic sensor further comprises a magnetic domain control member on at least one side in width of said magnetosensitive film.

18. The head according to claim 16, wherein said magnetic sensor further comprises a magnetic bias applying member on the opposite side of a magnetosensitive surface of said magnetosensitive film.

19. The head according to claim 15, wherein said other of said terminals has a predetermined shape in a section perpendicular to said film surface and parallel to a magnetosensitive surface, said shape having its width changing from one portion to another.

20. The head according to claim 15, wherein said other of said terminals has a predetermined shape in a section perpendicular to said film surface and parallel to a magnetosensitive surface, said shape having a uniform width.

21. The head according to claim 15, wherein one of said terminals and part or the whole of the other of said terminals are made of a magnetic shielding material.

22. A magnetic apparatus equipped with a read/write magnetic head in which a read magnetic head comprising a magnetic sensor for reading information stored in a magnetic recording medium is integrated with a write magnetic head for writing information into said magnetic recording medium,
said sensor comprising:
a magnetosensitive film for sensing an external magnetic field; and
a pair of terminals that vertically sandwich said magnetosensitive film for applying an electric current to said magnetosensitive film in a direction perpendicular to a film surface of said magnetosensitive film,
one of said terminals having a surface that is opposed to said magnetosensitive film so as to include the whole area of said film surface, while the other of said terminals having a surface that is smaller in area than said film surface and opposed to said magnetosensitive film so as to fall within the area of said film surface.

23. The apparatus according to claim 22, wherein said surface of said one of said terminals is larger in area than said film surface.

24. The apparatus according to claim 23, wherein said magnetic sensor further comprises a magnetic domain control member on at least one side in width of said magnetosensitive film.

25. The apparatus according to claim 23, wherein said magnetic sensor further comprises a magnetic bias applying member on the opposite side to a magnetosenstive surface of said magnetosensitive film.

26. The apparatus according to claim 22, wherein said other of said terminals has a predetermined shape in a section perpendicular to said film surface and parallel to a magnetosensitive surface, said shape having its width changing from one portion to another.

27. The apparatus according to claim 22, wherein said other of said terminals has a predetermined shape in a section perpendicular to said film surface and parallel to a magnetosensitive surface, said shape having a uniform width.

28. The apparatus according to claim 22, wherein one of said terminals and part or the whole of the other of said terminals are made of a magnetic shielding material.

* * * * *

UNITED STATES PATENT AND TRADEMARK OFFICE
CERTIFICATE OF CORRECTION

| | | |
|---|---|---|
| PATENT NO. | : 7,130,162 B2 | Page 1 of 1 |
| APPLICATION NO. | : 09/788823 | |
| DATED | : October 31, 2006 | |
| INVENTOR(S) | : Seyama et al. | |

It is certified that error appears in the above-identified patent and that said Letters Patent is hereby corrected as shown below:

In the Claims:

Col. 11, line 57, delete "one side in height of said" and insert --the opposite side of a--.

Signed and Sealed this

Tenth Day of April, 2007

JON W. DUDAS
*Director of the United States Patent and Trademark Office*